Nov. 27, 1945.  W. BRIERLEY  2,389,760
AIRSCREW
Filed Sept. 18, 1942  3 Sheets-Sheet 1
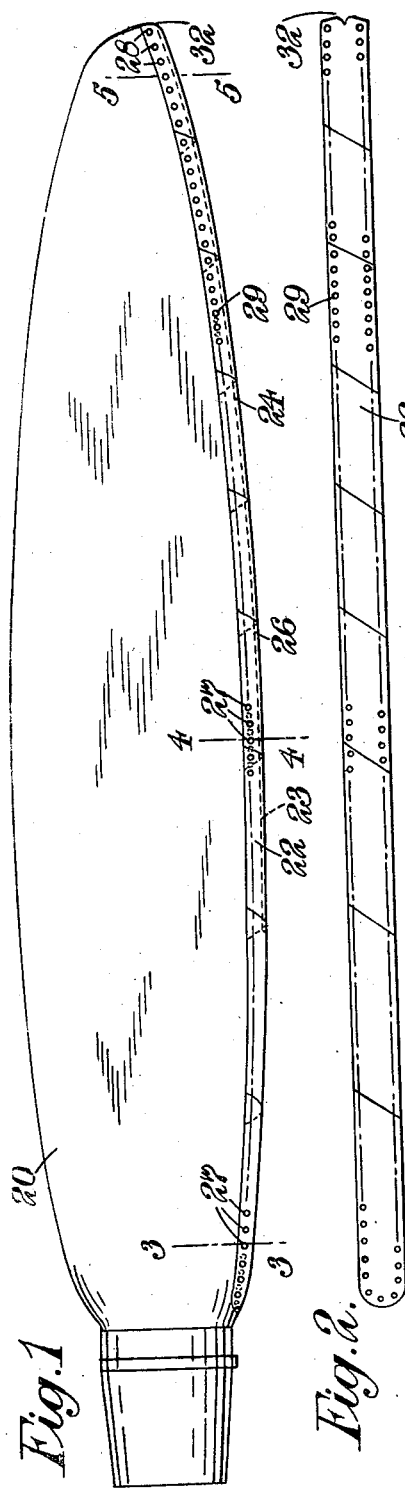
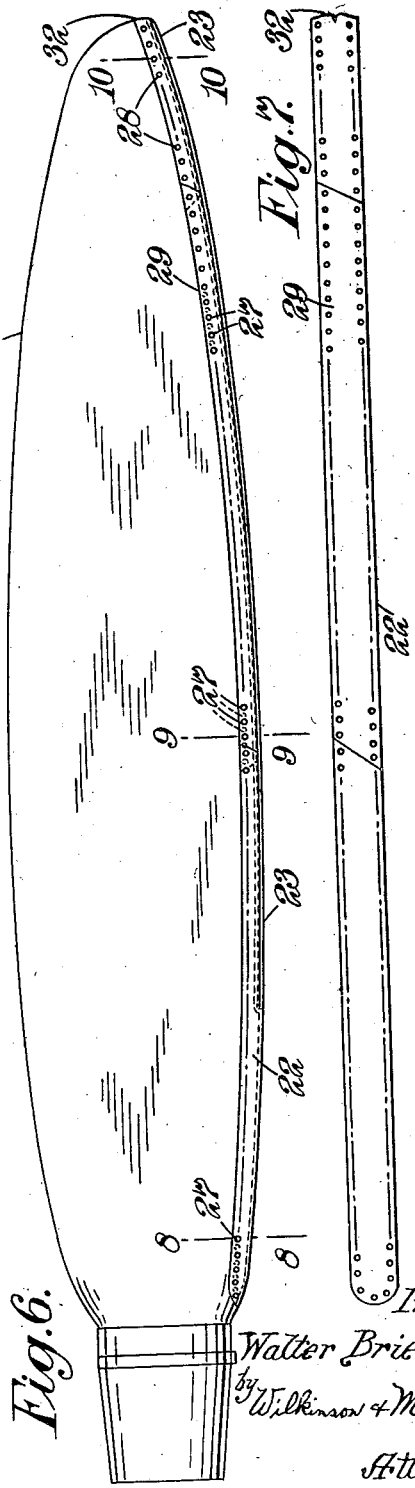
Inventor
Walter Brierley
by Wilkinson & Mawhinney
Attorneys

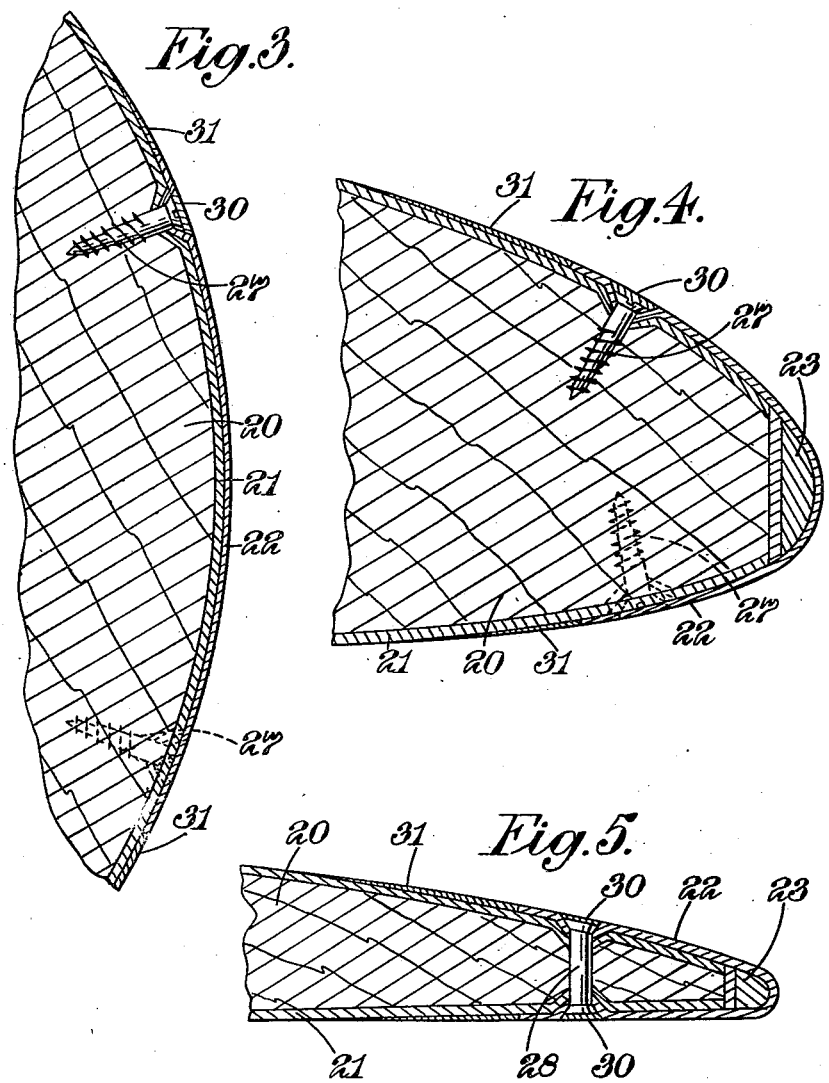

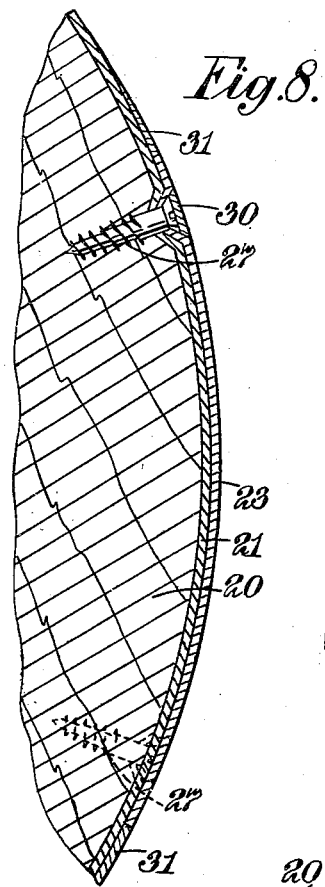
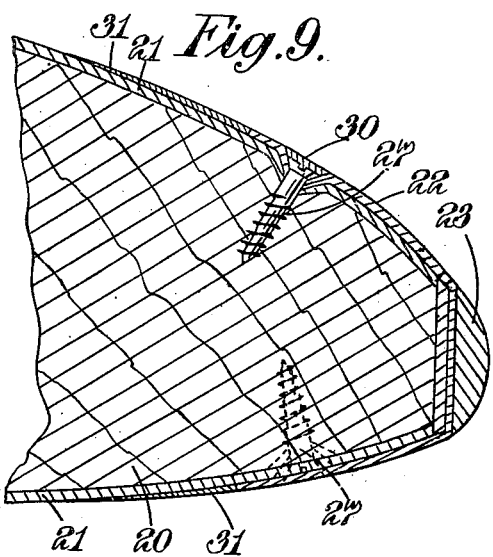
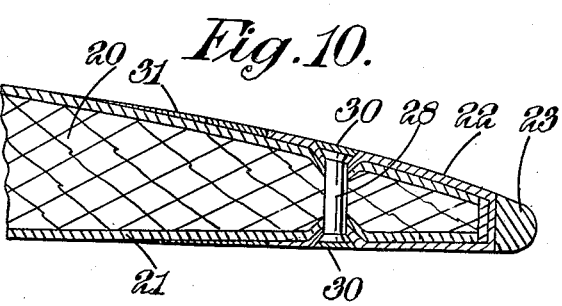

Patented Nov. 27, 1945

2,389,760

UNITED STATES PATENT OFFICE 2,389,760

AIRSCREW

Walter Brierley, Gloucester, England, assignor to Rotol Limited, a British company Application September 18, 1942, Serial No. 458,773
In Great Britain August 24, 1940

5 Claims. (Cl. 170—159)

This invention relates to airscrews for aircraft having airscrew-blades of the kind which are made of a comparatively soft or non-metallic material, such as wood, "improved wood," synthetic resin or the like. Various constructions and arrangements have been proposed for strengthening the leading edge of such blades to protect them against damage by impact against objects that may be encountered in flight, and this invention has for its object to provide an improved form of such reinforcement.

According to the present invention there is combined with an airscrew-blade of the above kind, a reinforcement for the leading edge of the blade which comprises a metallic sheath and a reinforcing metal rod secured inside, or to the outside of, the sheath, and which is formed externally to the aerodynamic shape of the leading edge. The sheath is made of sheet metal, preferably mild steel or stainless steel, and the reinforcing rod is similarly made of any suitable metal, preferably mild steel.

The sheath may be divided into sections for convenience in manufacture and the rod may be in one length or divided also into sections with the joints in the rod staggered with respect to those in the sheath so that the joints do not extend through the whole reinforcement. The joints in the sheath also serve to give the reinforcement a measure of flexibility which is desirable when the blade is made of a flexible material such as spruce. Where flexibility of the reinforcement is not important, the joints in the sheath may be scarfed in opposite directions on the two faces of the blade so as more readily to cope with impact at a joint. Where flexibility is desirable, the joints should be square to the leading edge of the blade, or if the sheath is made in one piece or in comparatively few sections, the sheath may be provided with slits extending from its edges to make it more flexible.

Two airscrew-blades in accordance with this invention will now be described, by way of example only, with reference to the accompanying drawings, in which—

Figure 1 is a view looking on the camber face of the first blade,

Figure 2 is a development of a sheath incorporated in the first blade,

Figures 3, 4 and 5 are sections on the lines 3—3, 4—4 and 5—5, respectively, of Figure 1, Figure 6 is a view looking on the camber face of the second blade, Figure 7 is a development of a sheath incorporated in the second blade, and Figures 8, 9 and 10 are sections on the lines 8—8, 9—9 and 10—10 of Figure 6.

Like reference numerals indicate like parts in all the figures of the drawings.

The blade 20 shown in Figure 1 is made of a soft material and is provided with a covering 21 of cellulose nitrate or cellulose acetate sheet or gauze embedded in a suitable synthetic resin to protect the blade against erosion. A reinforcement is secured to the leading edge of the blade and consists of a sheath 22 and a rod 23. The sheath is made in nine sections as shown in the development of Figure 2 so that each section can be made from a sheet metal blank in a comparatively small press. Each section may be pressed to its final shape or pressed or rolled to a uniform cross-section and then twisted to suit the blade shape according to economic considerations in manufacture and it will be noted that the sections near the tip of the blade, where the change in cross-section is the greatest, are made shorter than those near the root of the blade. As shown in Figure 2, the abutting ends of each section are inclined to the length of the sheath to provide scarfed joints between the sections and increase the ability of the sheath to take an impact at a joint. When the blade is made of spruce or other flexible material, the sheath should also be flexible and the ends of the sections should then be made normal to the length of the sheath to make the assembled sheath more flexible. The sheath is preferably made of mild steel and brass dipped.

The rod 23 is made in three sections and extends from the tip of the blade to the joint between the second and third sections of the sheath, counting from the root end. Each section may be extruded, rolled, drawn, cast or machined in any convenient manner to give it the necessary cross-section substantially to fill the space between the forward edge of the blade and the sheath. It may, for example, be made of rod or wire ground on one side to abut the blade proper, the curved side fitting within the sheath.

The reinforcement is first assembled in sub-units which are then secured on the blade. Thus the three sections of the sheath that will lie nearest the tip of the blade are mounted in a former and the corresponding section of the reinforcing rod is placed in them and brazed to them, sufficient brazing material being used to fill any spaces there may be between the sheath sections and the rod, which need be only an approximate fit in the corresponding sections of the sheath. This section of the rod is longer than the corresponding sections of the sheath by, say, half an inch so that it projects from this sub-unit of the reinforcement into the next sub-unit as shown at 24 in Figure 1. The next two sections of the sheath are secured to the corresponding section of the rod in a similar manner to form another sub-unit and this section of the rod will also project from one end of the sub-unit, as shown at 26 in Figure 1, but will not reach to the other end of the sub-unit so as to leave a space to receive the projecting end of the rod in the first sub-unit. The next two sections of the sheath and the corresponding section of the rod are also secured together in the same way to form a third sub-unit. The last two sections of the sheath are secured on the blade independently. Each of the three sub-units and the two independent sections of the sheath may be tinned all over or otherwise provided with a protective coating.

The sub-units and independent sections of the sheath are secured on the blade by rivets 28 or wood-screws 27. Rivets are used from the tip of the blade to a point 29 at which the thickness becomes too great and screws are used for the rest of the length of the reinforcement. The rivet-holes are drilled square to the pitch face of the blade as shown in Figure 5. The screws on one face of the blade are staggered with respect to those on the other face as can be seen from Figure 2. Both the rivet-heads and the screw-heads are countersunk and lie well below the outer surface of the sheath. Solder 30 is floated over the rivet-heads and the screw-heads to prevent them coming out and to provide a moisture-proof joint. The rivet-holes may be treated with a protective material to prevent moisture reaching the blade.

Filling 31 of suitable material is applied to the blade covering at the edges of the reinforcement to provide a smooth surface extending from the blade to the reinforcement. Alternatively the blade and its covering may be recessed to receive the edges of the reinforcement or the sheath may be thinned down at its edges. The tip 32 of the sheath is shaped to form a closure and is brazed, sweated or silver-soldered to give adequate strength and to provide a moisture-proof joint.

It will be noted that the joints in the sheath, except for the two joints nearest the root of the blade, are backed and supported by portions of the rod while the joints in the rod are protected by portions of the sheath owing to the staggering of the joints in these two parts.

The arrangement just described has the advantage that each section of the rod can be made of an appropriate uniform cross-section so as approximately to fill the space between the blade edge and the sheath and can then be built up to fill this space by depositing sufficient brazing material. In an alternative arrangement, the rod is made in one piece of the correct varying cross-section and is secured in position by being clamped between the blade edge and the sheath, without first being brazed to, or otherwise secured to the sheath.

The second blade shown in Figures 6 to 10 differs from the first blade mainly in that the reinforcing rod 23 is secured to the outside of the sheath 22 instead of to the inside. Other differences are that the rod is continuous and not in sections and that the sheath is in one short and two long sections only (see Figure 7). The three sections of the sheath are mounted on a former and the reinforcing rod is welded to them. The rod may be of the correct varying cross-section along its length to complete the aerodynamic shaping of the blade or it may be of smaller cross-section over the part of its length where its width is the greatest and the correct shaping obtained by depositing sufficient welding material to complete the desired shape. The reinforcement is preferably tinned all over and mounted as a unit on the blade in the manner already explained for the first blade.

The reinforcement on the second blade is considerably stronger and less flexible than that on the first blade owing to the fewer joints which it has and the use of a one-piece rod. On the other hand the reinforcement of the first blade can be made by the use of comparatively small presses. It will be understood that maximum strength will be obtained by making the sheath, as well as the rod, in one piece but that subdivision of the sheath, and to a lesser extent, the rod, into sections is desirable for economy in manufacture. Where the sheath is made in one piece or in a few long sections, the reinforcement may be too rigid to be suitable for use with blades made of spruce or other very flexible materials and the necessary flexibility can be given to such a reinforcement by slitting the sheath from each edge at a number of points along its length, the slits being substantially normal to the edge. Any joints in the sheath should also be normal to the length of the sheath.

I claim:

1. In combination, an airscrew blade comprising a blade body, a metallic reinforcement about the leading edge of said body, said reinforcement comprising unconnected U-shaped sections, and a series of rod like sections secured to said reinforcement sections, the joints of said reinforcement sections being staggered with respect to the joints of the rod sections.

2. An airscrew blade according to claim 1 in which the reinforcement sections adjacent the tip end of the blade are shorter than the remaining sections.

3. An airscrew blade according to claim 1 in which said rod sections have flat confronting sides and arcuate outer sides.

4. In combination with an air-screw blade of the kind described, a reinforcement for the leading edge of the blade comprising a metallic sheath and a reinforcing metal rod secured inside of the sheath, said sheath made in sections and the reinforcing rod made in sections with the joints of said reinforcing rod staggered with respect to the joints of said sheath.

5. In combination with an airscrew-blade of the kind described, a reinforcement for the leading edge of the blade, comprising a metallic sheath and a reinforcing metal rod secured inside of the sheath, the reinforcement being formed externally to the aerodynamic shape of the leading edge, said sheath being made in sections with the joints in the sheath scarfed in opposite directions on the two faces of the blade.

WALTER BRIERLEY.